(12) United States Patent
Lin et al.

(10) Patent No.: US 9,102,836 B2
(45) Date of Patent: Aug. 11, 2015

(54) ANTI-REFLECTION COATING COMPOSITION AND PROCESS FOR PREPARING THE SAME

(71) Applicant: ETERNAL CHEMICAL CO., LTD., Kaohsiung (TW)

(72) Inventors: Chi-Chuan Lin, Kaohsiung (TW); Li-Wen Juan, Kaohsiung (TW); Jui-Tsun Huang, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 143 days.

(21) Appl. No.: 13/714,615

(22) Filed: Dec. 14, 2012

(65) Prior Publication Data

US 2013/0158140 A1    Jun. 20, 2013

(30) Foreign Application Priority Data

Dec. 16, 2011   (TW) .............. 100146933 A

(51) Int. Cl.
*C09D 5/00* (2006.01)
*C09D 7/12* (2006.01)
*C08K 7/26* (2006.01)

(52) U.S. Cl.
CPC .............. *C09D 5/006* (2013.01); *C09D 7/1291* (2013.01); *C08K 7/26* (2013.01)

(58) Field of Classification Search
CPC ..................................... C09D 5/006
USPC .......................... 523/218; 521/54
See application file for complete search history.

(56) References Cited

FOREIGN PATENT DOCUMENTS

| | | |
|---|---|---|
| CN | 1931718 A | 3/2007 |
| CN | 101096564 A | 1/2008 |
| EP | 1 972 598 A1 | 9/2008 |
| JP | 2008-50384 A | 3/2008 |
| JP | 2008-169364 A | 7/2008 |
| JP | 2008-303358 A | 12/2008 |
| JP | 2009-66965 A | 4/2009 |
| JP | 2012-140286 A | 7/2012 |
| JP | 2012-159744 A | 8/2012 |
| WO | 2007/060884 A1 | 5/2007 |

OTHER PUBLICATIONS

Machine Translation of JP 2008050384 (2008).*
Non-English Chinese Office Action dated Oct. 22, 2013 for Chinese Application No. 201210236950.5 with English translation.
Search Report dated Sep. 27, 2013 for Chinese Application No. 201210236950.5 with English translation.
Notice of Reasons for Rejection dated Jun. 16, 2014 for Japanese Application No. 2012-272960 with English translation.
espacenet English abstract of CN 101096564A, 2007.
Machine translation of CN 101096564A, 2007.
Deng, Jiang Feng, "Preparation of Inorganic Oxide Hollow Microspheres with Composite coatings Structure", Thesis of Master Degree, WuHan University of Technology, Nov. 15, 2007.
Espacenet English abstract of WO 2007/060884 A1, 2007.
Espacenet English abstract of JP 2008-50384 A.
Machine translation of JP 2008-50384 A, 2008.
Espacenet English abstract of JP 2012-140286 A, 2012.
Espacenet English abstract of JP 2012-159744 A, 2012.
Espacenet English abstract of JP 2009-66965 A, 2009.
Espacenet English abstract of JP 2008-303358 A, 2008.
Espacenet English abstract of JP 2008-169364 A, 2008.
Espacenet English abstract of CN 1931718 A, 2007.

* cited by examiner

*Primary Examiner* — Hannah Pak
(74) *Attorney, Agent, or Firm* — Ladas & Parry LLP

(57) ABSTRACT

The present invention relates to an anti-reflection coating composition containing hollow particles, an adhesive, and a hydrophobic organic solvent, wherein the weight ratio of the hollow particles to the solids content of the adhesive is in the range of 1:2 to 1:20. The present invention also provides a method for producing the anti-reflection coating composition.

8 Claims, 4 Drawing Sheets

ANTI-REFLECTION COATING COMPOSITION AND PROCESS FOR PREPARING THE SAME

BACKGROUND OF THE INVENTION

1. Field of the Invention

The present invention relates to a coating composition containing hollow particles, and in particular, to a coating composition for preparing an anti-reflection coating layer. The present invention further relates to a method for preparing the coating composition containing hollow particles.

2. Description of the Related Art

When light enters another medium from the air, a part of the light is reflected back into the air due to the difference in the refractive index of the two media, resulting in undesired glare or optical loss. Therefore, coatings and coating films with anti-reflective properties have gradually come into use in a variety of fields, for example, displays and solar energy or other photoelectric fields, for the purpose of reducing the reflection of light.

For a conventional anti-reflection coating, one or more coating layers are formed on a substrate, so that a gradient variation of the refractive index is generated between the substrate (for a glass substrate, the refractive index is about 1.52) and the air (the refractive index is about 1), so as to reduce the reflected light loss due to an excessively large difference in refractive index. In selection of coating layer materials in the prior art, addition of solid particles into a resin is widely adopted in the industry. However, since solid particles have a high refractive index, the effect of the anti-reflection coating layer prepared from them is limited.

As hollow particles have pores, the refractive index of such particles can be further reduced by an air layer or resin filled in the pores. Therefore, one focus of studies on preparation of an anti-reflection coating layer having a low refractive index has been on examining the use of hollow particles. However, compared with preparation of common solid particles, the preparation method of hollow particles is complex, expensive and difficult, making the objective of industrial production difficult to achieve.

Present methods for preparing hollow particles in the industry are based on a template method. The template method involves using a template as a core, forming a shell with a desired particle material on a surface of the template, and finally removing the template by a process such as etching or high-temperature calcination, so as to prepare a hollow particle. For example, in US Patent Publication No. 2010/0015433A1, an anti-reflection coating containing core-shell particles is first prepared, coated on a substrate, and then subjected to high-temperature treatment to remove the core material. However, the technology in which the core or template materials is removed through high-temperature heating after coating cannot be applied to a common and conventional plastic substrate such as PET, PC and PMMA, because high-temperature treatment is required.

However, in the methods for preparing hollow particles with a template, no matter whether the template is an organic polymer or inorganic material, a hydro-thermal process or a heating process is required, in which the template needs to be removed through high-temperature calcination or strong acid (for example hydrofluoric acid) or strong base corrosion, so the process is complex, expensive, and impractical for industrial production.

Chinese Patent Publication No. 1931718A discloses a method for preparing hollow silica particles, in which a sol-gel process is used to polymerize a silica precursor on a polyelectrolyte, and then the polyelectrolyte and silica are separated by repeated centrifuging and washing, so as to prepare the hollow particles. However, the process is complex, and the centrifugation that is adopted is not advantageous for industrial mass production.

In a general method for preparing an anti-reflection coating layer, for example, in a method disclosed in Chinese Patent Publication Nos. 101312909A and 1989070A, powdered hollow particles are first prepared, then mixed with an adhesive and a solvent to prepare an anti-reflection coating, and then the anti-reflection coating is applied onto a substrate to prepare a coating layer. However, the resulting hollow particles are nanoparticles, and the hollow particles are easily agglomerated during mixing due to collision and cannot retain dimensional stability. In addition, the hollow particles are required to have high dispersibility in the coating, so as to avoid non-uniform distribution in the coating layer and eliminate adverse impact on the anti-reflection effect.

In view of the above, the present invention provides an anti-reflection coating composition containing hollow particles and a method for preparing the same to solve the problems described above. The anti-reflection coating composition according to the present invention has high dispersibility, so the hollow particles can be uniformly distributed in a coating layer to exert the anti-reflection function, so as to improve light transmittance. In addition, the method according to the present invention can be carried out at normal temperature; and moreover, as the template can be removed without high-temperature heating or treatment with a strong acid or strong base, the preparation steps are effectively simplified, energy consumption is lowered, and cost is reduced, thus rendering it suitable for industrial mass production.

SUMMARY OF THE INVENTION

The present invention is mainly directed to an anti-reflection coating composition comprising hollow particles, an adhesive and a hydrophobic organic solvent, wherein the hollow particles are dispersed in the adhesive and are chemically bonded with the adhesive, and the weight ratio of the hollow particles to the adhesive is in the range of 1:2 to 1:20.

The present invention is further directed to a method for preparing the coating composition at normal temperature.

DETAILED DESCRIPTION OF THE INVENTION

Figure 1:
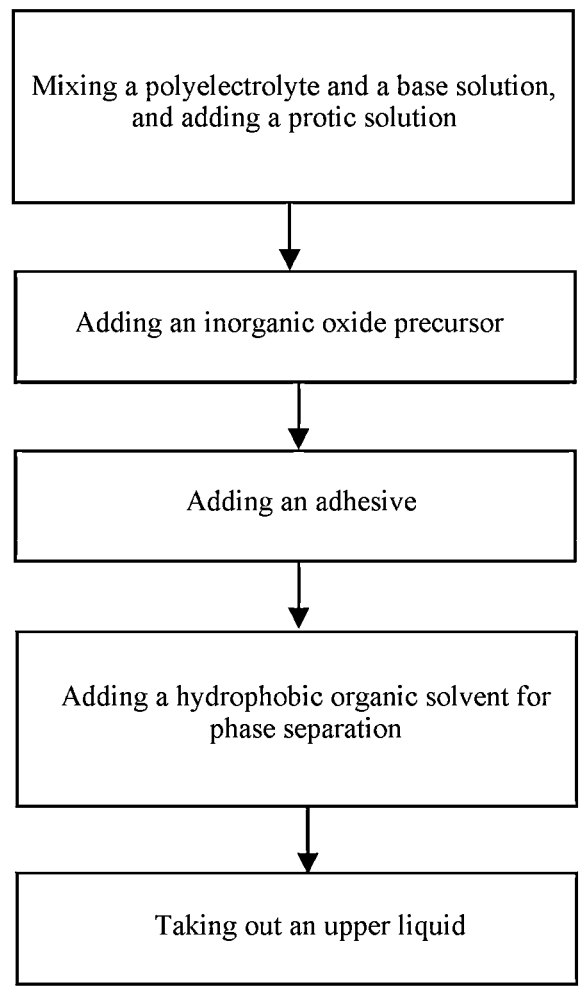
FIG. 1 is a flow chart of a method for preparing a coating composition containing hollow particles according to the present invention.

The hollow particles contained in the coating composition according to the present invention are inorganic oxide particles containing an element selected from the group consisting of silicon, titanium, zirconium and a combination thereof, and preferably inorganic oxide particles containing silicon, for example, hollow silica particles.

The size of the hollow particles is not particularly limited, and can be at nanometer or micrometer level, preferably in the range of 10 nm to 100 nm, and more preferably in the range of 50 nm to 80 nm.

With a hydrophobic group, the adhesive used in the present invention can be effectively dissolved and dispersed in the hydrophobic organic solvent. The hydrophobic group includes for example, but is not limited to, phenyl, benzyl, alkyl and a combination thereof, with $C_{1-5}$ alkyl being preferred for the alkyl. In addition, the adhesive used in the present invention has a group —$Si(OR^1)_n(R^2)_{3-n}$, where n is an integer selected from 2 or 3, $R^1$ is each independently H or $C_{1-4}$ alkyl, and $R^2$ is each independently H or $C_{1-4}$ alkyl. Therefore, the adhesive according to the present invention can be chemically bonded with a hydroxyl group on the surface of the hollow particles through condensation, so that the hollow particles can be uniformly dispersed in the adhesive, thereby avoiding agglomeration or sedimentation.

The type of the adhesive is not particularly limited and includes, for example, but is not limited to, a polyacrylic resin modified by a silicon-containing compound or a polysiloxane resin. Depending on the physical-chemical properties required by the reflective coating layer or the type of the substrate to be coated, those of ordinary skill in the art would choose an adhesive that has good adhesion with the substrate. For example, when the substrate is a glass substrate, the polysiloxane resin may be selected; when the substrate is a plastic substrate such as an acrylonitrile-butadiene-styrene (ABS), polycarbonate (PC), polypropylene (PP), polyethylene terephthalate (PET) or polymethyl methacrylate (PMMA) substrate, a polyacrylic resin modified by a silicon-containing compound or a polysiloxane resin may be selected.

The polyacrylic resin is derived from one or more of the following monomers as polymerization units: acrylic acid, methacrylic acid, methyl acrylate, methyl methacrylate, butyl acrylate, butyl methacrylate, isobutyl acrylate, isobutyl methacrylate, hydroxyethyl acrylate, isobornyl acrylate, isobornyl methacrylate, 2-hydroxyethyl acrylate, 2-hydroxyethyl methacrylate, 2-hydroxypropyl acrylate and 2-hydroxypropyl methacrylate.

The silicon-containing compounds for modification suitable for the present invention are preferably organosilanes with terminal reactive groups. The reactive groups include, for example, but are not limited to amino groups, hydroxyl groups, mercapto groups, isocyanate groups, epoxy groups, vinyl groups, or (meth)acryloxy groups.

The examples of the silicon-containing compound for modification include, for example, but are not limited to, vinyltrimethoxysilane, vinyltriethoxysilane, vinyltri(β-(methoxyethoxy)silane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, N-phenyl-γ-aminopropyltrimethoxysilane, 3-isocyanatepropyltriethoxysilane, and γ-mercaptopropyltrimethoxysilane, among which vinyltrimethoxysilane, vinyltriethoxysilane, vinyltri(β-(methoxyethoxy)silane, γ-glycidoxypropyltrimethoxysilane, γ-glycidoxypropylmethyldiethoxysilane, γ-glycidoxypropyltriethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, and N-phenyl-γ-aminopropyltrimethoxylsilane and a combination thereof are preferred.

The polysiloxane resin is derived from one or more silicon oxide monomers as polymerization units, and the silicon oxide monomers are represented by the formula: $SiR^3(OR^4)_3$, where $R^3$ is vinyl, phenyl or $C_{1-5}$ alkyl, and $R^4$ is each independently H or $C_{1-4}$ alkyl.

The commercially available silicon oxide monomers suitable for the present invention include, for example, but are not limited to KBE-903, KBM-1003, KBM-1403, KBM-303, KBM-403, KBE-402, KBM-503, KBM-502, KBE-502, KBM-603, KBM-602, KBE-603, KBM-903, KBE-903, KBE-9007, KBE-9103, KBM-573, KBM-802, KBM-803, KBM-103, and KBM-13 (Shin-Etsu Chemical Co., Ltd.).

According to the present invention, the weight ratio of the hollow particles to the solid content of the adhesive is in the range of 1:2 to 1:20, preferably is in the range of 1:3 to 1:20, and more preferably is in the range of 1:3 to 1:10. If the particle content is excessively low, the reflection of light cannot be effectively reduced; and if the particle content is excessively high, the adhesion to the substrate will be adversely influenced, and the adhesive cannot completely cover the hollow particles, so the hollow particles cannot be effectively dispersed in the adhesive.

The hydrophobic organic solvent useful in the present invention is not particularly limited, and may include, for example, but is not limited to, an aromatic hydrocarbon, an aliphatic hydrocarbon or an ester. The aromatic hydrocarbon includes, for example, but is not limited to, benzene, toluene and xylene; the aliphatic hydrocarbon includes, for example, but is not limited to, hexane, cyclohexane and heptane; the ester includes, for example, but is not limited to, methyl acetate, ethyl acetate and butyl acetate. Preferably, the hydrophobic organic solvent useful in the present invention is selected from the group consisting of toluene, ethyl acetate, butyl acetate and a combination thereof.

The amount of the hydrophobic organic solvent is not particularly limited, provided that the resin components can be effectively dissolved and can be conveniently coated. According to an implementation aspect of the present invention, the ratio of the weight of the hydrophobic organic solvent to the total weight of the hollow particles and the solid content of the adhesive is in the range of 1.5:1 to 40:1, preferably from 2:1 to 15:1, and most preferably is in the range of 2:1 to 11:1.

Optionally, the coating composition according to the present invention may contain an additive conventional to those of ordinary skill in the art, which includes, for example, but is not limited to, a pigment, a filler, a curing agent, a curing promoter, an ultraviolet absorbent, an anti-static agent, a flatting agent, a stabilizer, a heat removal aid or an anti-flooding agent.

The coating composition according to the present invention may be coated onto a component or substrate that needs anti-reflection function to form an anti-reflection coating layer. The coating composition according to the present invention is particularly suitable for hollow particles at nanometer levels since the hollow particles can be dispersed in the adhesive and chemically bonded with the adhesive, thereby preventing the hollow particles from agglomerating or settling; and the composition according to the present invention is suitable for preparation of a thin anti-reflective layer due to good fluidity, thereby reducing the light loss caused by absorption in the resin or other components when the light penetrates the coating. Therefore, the coating composition according to the present invention is particularly useful in the fields of displays or solar energy, and can effectively reduce reflection loss of the photo energy and improve the light transmittance, thereby further improving the performance.

According to an implementation aspect of the present invention, the coating composition according to the present invention may be coated onto a substrate, and after the solvent is removed, an anti-reflection coating layer is formed.

The coating method can be any well known to those of ordinary skill in the art, which includes, for example, but is not limited to knife coating, roller coating, micro gravure coating, flow coating, dip coating, spray coating, slot die coating, spin coating, and curtain coating.

The thickness of the anti-reflection coating is not particularly limited and is primarily dependent on the size of the hollow particles and the content of the adhesive required for adhering the hollow particles onto the substrate. According to an implementation aspect of the present invention, when the size of the hollow particles is at nanometer levels, the anti-reflection coating layer has a thickness in the range of 100 nm to 1,000 nm, and preferably in the range of 100 nm to 150 nm.

The substrate used in the invention can be any species already known to those of ordinary skill in the art, which includes, for example, glass or plastic substrate. Suitable plastic substrates are not particularly limited and can be any one well known to those of ordinary skill in the art, which include, for example, but are not limited to a polyester resin, such as polyethylene terephthalate (PET) or polyethylene naphthalate (PEN); a polyacrylate resin, such as polymethyl methacrylate (PMMA); polyolefin resin, such as polyethylene (PE) or polypropylene (PP); polycycloolefin resin; polyamide resin, such as nylon 6, nylon 66, or MXD nylon (a copolymer of m-xylene diamine/adipic acid); a polyimide resin; a polycarbonate resin; a polyurethane resin; polyvinyl chloride (PVC); triacetyl cellulose (TAC); polylactic acid; a substituted olefin polymer, such as polyvinyl acetate or polyvinyl alcohol; a copolymeric resin, such as EVA, copolymer of ethylene/vinyl alcohol or copolymer of ethylene/tetrafluoroethylene; or a combination thereof.

The coating composition according to the present invention may be formulated by using any conventional hollow particles, adhesive and hydrophobic organic solvent. However, the coating composition according to the present invention is preferably prepared in situ through the method according to the present invention (described below in detail) by using an appropriate amount of reactants and solvent.

Given the above, the present invention further provides a method for preparing an anti-reflection coating composition containing hollow particles, which includes the following steps:

(a) mixing a polyelectrolyte with a base, and then adding a protic solvent to the resultant mixture;

(b) slowly adding an inorganic oxide precursor to the solution obtained in Step (a), so that the inorganic oxide covers the surface of the polyelectrolyte to form composite particles;

(c) adding an adhesive to the solution obtained in Step (b);

(d) adding a hydrophobic organic solvent to the solution obtained in Step (c), so that the polyelectrolyte is dissolved out of the center of the composite particles and hollow particles are prepared and phase separation occurs, and the hollow particles, adhesive and hydrophobic organic solvent are distributed in an upper liquid, and the polyelectrolyte, protic solvent and remaining components are distributed in a lower liquid; and (e) taking out the upper liquid to prepare the coating composition according to the present invention.

FIG. 1 is a flow chart of the method according to the present invention.

The polyelectrolyte in Step (a) is used as a template material for synthesizing the hollow particles, where the compositional units of the polyelectrolyte have one or more cleavable groups, and can form a micelle structure. The polyelectrolyte useful in the present invention includes, for example, but is not limited to, polyacrylic acid (PAA), polymethacrylic acid, sodium polyacrylate (PAS), sodium polymethacrylate (PMAS), polystyrene sulfonic acid, polyvinyl sulfonic acid, polyvinyl phosphoric acid, melamine-formaldehyde colloidal particles, polyvinyl amine, polyvinyl pyridine and polyethylene glycol, among which polyacrylic acid (PAA), sodium polyacrylate (PAS) and sodium polymethacrylate (PMAS) are preferred.

The base suitable for use in Step (a) can be any inorganic base or organic base that is advantageous for the formation of the composite particles having the inorganic oxide covering on the polyelectrolyte. According to the present invention, the base is preferably ammonia or aqueous ammonia, and more preferably aqueous ammonia, which can form an ion pair with a functional group on the outer side of the polyelectrolyte, thereby enhancing the hydrophilicity of the polyelectrolyte and facilitating the inorganic oxide precursor to react on the outer side of the polyelectrolyte in a sol-gel process, so as to synthesize an inorganic oxide. As a result, the inorganic oxide covers the polyelectrolyte on the outer side to form composite particles, and the polyelectrolyte is dissolved out in subsequent phase separation step and remains in the protic solvent. According to an embodiment of the present invention, the concentration of the aqueous ammonia is in the range of 15% to 25%, based on weight percent of ammonia.

The protic solvent used in Step (a) is a polar protic solvent, and the type of the protic solvent is not particularly limited and includes, for example, but is not limited to, water; an alcohol, such as methanol, ethanol or propanol; an organic acid, such as formic acid, acetic acid or propanoic acid, and a combination thereof, among which the alcohols, organic acids or combinations thereof are preferred, and the alcohols are more preferred.

In Step (a), the weight ratio of the polyelectrolyte to the base is in the range of 1:30 to 1:60; the amount of the protic solvent is not particularly limited, provided that no agglomeration or precipitation occurs before and after the synthesis of the composite particles. According to the present invention, the weight ratio of the protic solvent to the base is in the range of 1:1 to 99:1, and preferably in the range of 5:1 to 35:1. According to an embodiment of the present invention, after addition of the protic solvent, the solution in Step (a) preferably has a pH of 9 to 12.

The inorganic oxide precursor used in Step (b) is a material containing an element selected from the group consisting of silicon, titanium, zirconium and combination thereof, with a silicon-containing material being preferred. The silicon-containing material preferably has the formula below:

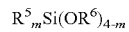

$R^5{}_m Si(OR^6)_{4-m}$ where $R^5$ is each independently selected from $C_{1-4}$ alkoxy, $C_{2-4}$ alkenyl, phenyl, $C_{1-4}$ alkyl and an epoxy group; $R^6$ is each independently selected from $C_{1-4}$ alkyl; and m is 0 or 1, preferably 0.

Examples of the silicon-containing material include, for example, but are not limited to, tetramethoxysilane, tetraethoxysilane (TEOS), and methyltriethoxysilane and a combination thereof, with tetraethoxysilane (TEOS) being preferred.

The weight ratio of the inorganic oxide precursor to the base is in the range of 20:1 to 1:10, and preferably in the range of 6:1 to 1:6.

According to the present invention, optionally, a water washing step is carried out after Step (b) and before Step (c), to remove excess base.

Step (b) is carried out with stirring, and the reaction time is not particularly limited and depends on the desired size and wall thickness of hollow particles, provided that the inorganic oxide precursor can fully react on the polyelectrolyte to form the inorganic oxide to cover the polyelectrolyte. According to an embodiment of the present invention, at normal temperature, the reaction time of Step (b) is in the range of 1 hour to 12 hours, and preferably is in the range of 5 hours to 8 hours.

Step (c) is carried out with stirring, and the reaction time is not particularly limited, provided that the adhesive can be chemically bonded with the inorganic oxide that covers the polyelectrolyte, and the particles prepared in Step (b) can be uniformly distributed in the adhesive to form a resinous state with the adhesive as a whole. According to an embodiment of the present invention, at normal temperature, the reaction time of Step (c) is in the range of 1 hour to 12 hours, and preferably is in the range of 5 hours to 8 hours.

The type of the adhesive used in Step (c) is as defined previously.

The weight ratio of the solid content of the adhesive used in Step (c) to the inorganic oxide precursor used in Step (b) is in the range of 2:1 to 20:1. The weight of the inorganic oxide precursor is that of the hollow particle to be prepared.

According to a preferred embodiment of the present invention, the adhesive used is a polyacrylic resin modified by a silicon-containing compound or a polysiloxane resin, the inorganic oxide that covers the polyelectrolyte is silica, where the silicon atoms on the surface of silica form —Si—OH bonds with solution molecules, and by using these bonds, a bonding reaction with the —Si—OR groups on the adhesive occurs, so that the hollow particles are uniformly dispersed in the adhesive and form a resinous state with the adhesive as a whole. Therefore, not only agglomeration or sedimentation of the hollow particles is prevented, but also the hollow particles are effectively fixed and uniformly dispersed in the coating layer without falling off.

The type of the hydrophobic organic solvent used in Step (d) is as defined previously.

The amount of the hydrophobic organic solvent used in Step (d) is not particularly limited, and the hydrophobic organic solvent may be slowly added until the polyelectrolyte is dissolved out of the center of the composite particles so that hollow particles are formed and phase separation occurs. Based on the total weight of the inorganic oxide precursor and the solid content of the adhesive, the amount of hydrophobic organic solvent is in the range of 1.5:1 to 40:1, preferably in the range of 2:1 to 15:1, and most preferably in the range of 2:1 to 11:1.

Steps (a) to (e) can be carried out at normal temperature; but, for accelerating the reaction, Steps (a) to (e) can also be carried out at an elevated temperature, for example, at a temperature in the range of 25° C. to 60° C.

The method according to the present invention may be carried out at normal temperature by adding the hydrophobic organic solvent to dissolve the hydrophilic polyelectrolyte out of the particle center, and phase separation occurs simultaneously, thereby easily preparing a coating composition containing the hollow particles, adhesive and hydrophobic organic solvent. Since all the steps in the method according to the present invention may be carried out at room temperature, and the template at the particle center can be removed without conducting high temperature calcination or corrosion with hydrofluoric acid, the method according to the present invention is relatively simple, and the process steps are simplified, the production time is reduced, and the energy consumption and cost are lowered, so that rapid mass production can be achieved.

The coating composition prepared by the method of the present invention may be directly applied to form a coating layer without further formulation or treatment, thereby eliminating the problems associated with the complexity of any subsequent processes. However, if desired, the composition prepared by the present invention can be subjected to subsequent treatment, prior to application to other technical fields where hollow particles are required.

Moreover, after the coating composition according to the present invention is applied, merely removal of the solvent is required, without the step of removing the template by solidifying or heating. Therefore, the coating composition can be applied to a plastic substrate, such as polymethyl methacrylate, polycarbonate or polyethylene terephthalate, that is suitable for a low temperature coating process; and moreover, agglomeration or sedimentation of the hollow particles is reduced. In addition, due to good dispersibility, the coating composition according to the present invention can be used to prepare a coating layer with good uniformity and anti-reflection properties.

The coating layer formed after applying the coating composition of the present invention generally has a porosity of 45% to 70%. The porosity refers to a proportion of void volume between particles in a deposit of a loose granular material. In the present invention, the porosity is one of factors that influence the refractive index of the resulting coating layer, and the instrument that is generally used for measuring the porosity is an optical film thickness monitor or ellipsometer. The coating layer obtained by a preferred embodiment of the present invention preferably has the porosity in the above-mentioned range.

The following examples are used to further describe the present invention, but not intended to limit the scope of the present invention. Modifications and variations easily made by those skilled in the art fall within the scope of the disclosure of the specification and the accompanying claims.

Preparation Example 1

Preparation of Polyacrylic Resin Modified by Silicon-Containing Compound 107 g mixed solvent of n-butanol and butyl acetate at equal proportions was heated to 120° C. and kept at the temperature, then 10 g acrylic acid (Formosa Plastics Corp.), 50 g methacrylic acid (Formosa Plastics Corp.), 40 g n-butyl methylacrylate (Formosa Plastics Corp.) and 0.1 g azodiisobutyronitrile (V60, Guangzhou Xiaoyu Chemical Corp.) as a thermal initiator were mixed homogeneously, and then dropped slowly into the solvent that was kept at 120° C. and reacted for 3 hours to 8 hours. Next, 6.5 g γ-glycidoxypropyltrimethylsilane (KBM403, Shin-Etsu Chemical Co., Ltd.) and then 0.1 g triphenylphosphine (Anhwei Wotu Chemical Co., Ltd.) as a catalyst were further added, and reacted for 4 hours to 6 hours at 110° C., to give 213.7 g polyacrylic resin modified by a silicon-containing compound (solid content of about 50%). The weight average molecular weight (Mw) was measured to be 12,000 by using a gel permeation chromatography (model: Waters 2414 RI).

Preparation Example 2

Preparation of Polysiloxane Resin 100 g isobutanol and 1.5 g acetic acid were added to a reaction flask, heated to 45° C. and kept at this temperature, then 20 g vinyltrimethoxysilane (KBM1003, Shin-Etsu Chemical Co., Ltd.) was dropped slowly into the flask within about 1 hour and heated to 75° C. and kept at this temperature, and subsequently 15 g phenyltrimethoxysilane (KBM103, Shin-Etsu Chemical Co., Ltd.) and 15 g methyltrimethoxysilane (KBM13, Shin-Etsu Chemical Co., Ltd.) were dropped slowly into the flask within about 2 hours and reacted for 4 hours at 75° C., to give a polysiloxane resin with a solid content of about 30%. The weight average molecular weight (Mw) was measured to be 3,000 by using a gel permeation chromatography (model: Waters 2414 RI).

Example 1

Hollow Particles:Solid Content of the Adhesive=1:3

Figure 2:
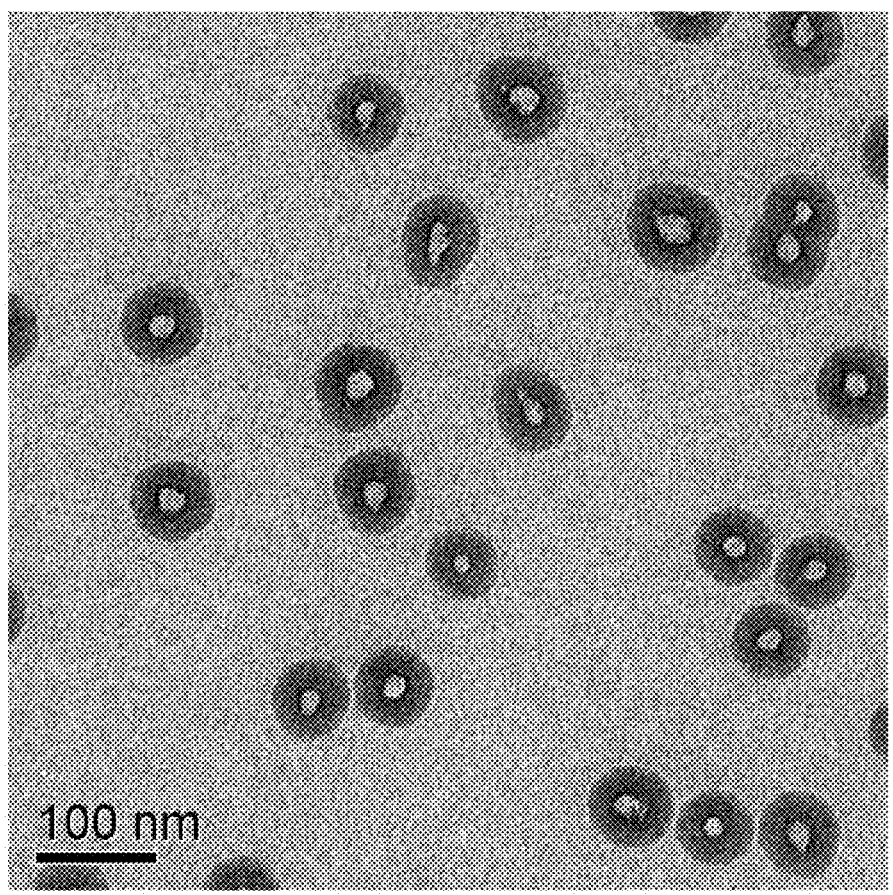
FIG. 2 is a TEM image of the shell-core silica nanoparticles formed in Example 1 according to the present invention.

0.5 g polyacrylic acid (model: 06519-250, Polyscience Corp.; weight average molecular weight (Mw): 5000, solid content: 50%) and 25 g aqueous ammonia (25%) were mixed fully, 200 g ethanol solution (95%) at 50° C. was added to the mixture, and then about 4.6 g tetraethoxysilane (TEOS) was added slowly, reacted with continuous stirring for 5 hours to give a composite particle A. The composite particle A (shell-core particles containing a polyacrylic acid template) was analyzed by using a transmission electron microscope (TEM), and the results were shown in FIG. 2. As shown in FIG. 2, the particles with a particle diameter less than 100 nm can be prepared by using the method according to the present invention.

The resulting composite particle A was washed with water, 27.6 g polyacrylic resin of Preparation Example 1 (solid content of 50%) was slowly added, and reacted with continuous stirring for 5 hours at 50° C. to give a mixed solution containing particles. The mixed solution was cooled to 25° C., 200 g toluene was added for phase separation, and then an upper liquid layer was taken out, to give the coating composition according to the present invention. The upper liquid layer contained toluene, the adhesive and the hollow particles, where the weight ratio of the hollow particles to the solid content of the adhesive was calculated to be 1:3 by the test method.

Figure 3:
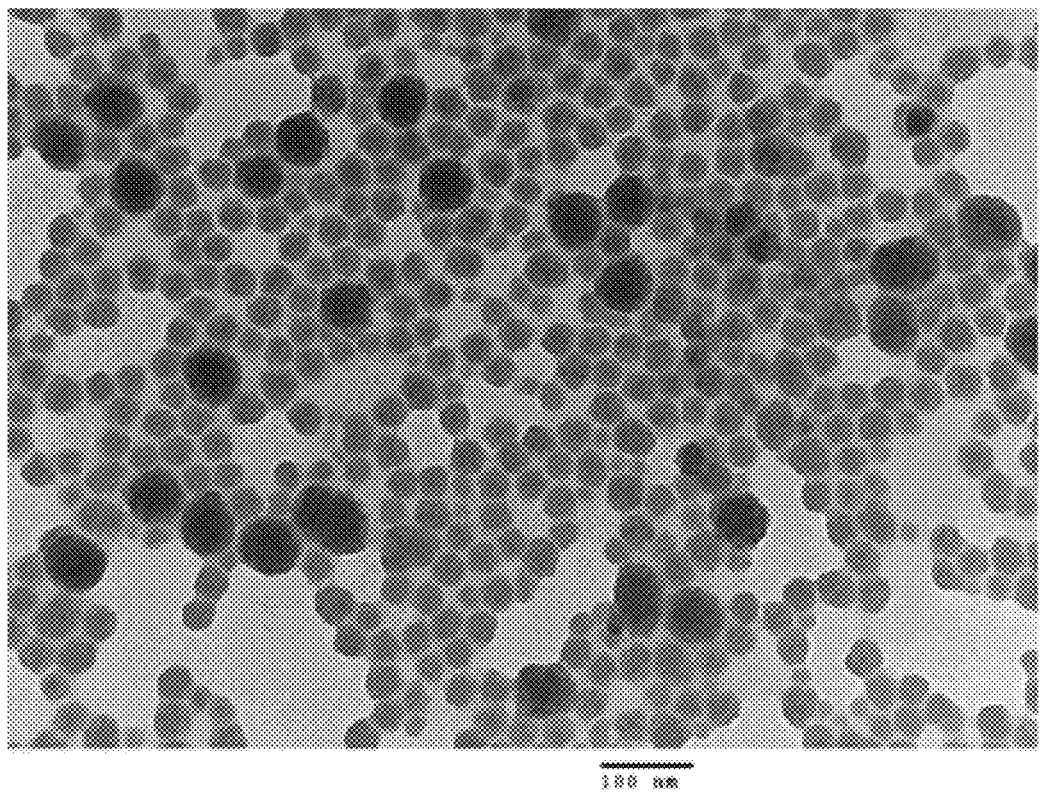
FIG. 3 is a TEM image of the hollow silica nanoparticles and adhesive formed in Example 1 according to the present invention.

The resulting upper liquid layer (the coating composition according to the present invention) was analyzed by using a transmission electron microscope (TEM), and the results were shown in FIG. 3. As shown in FIG. 3, as the particles (in the form of spheres as shown in the figure) are covered by the resin, no hollow structure can be observed; and it can be seen from FIG. 3 that the spheres are covered by the resin on the outer layer and an integrated resinous structure is formed. Therefore, the coating composition according to the present invention is in a resinous state.

Example 2

Hollow Particles:Solid Content of the Adhesive=1:20

0.5 g polyacrylic acid (model: 06519-250, Polyscience Corp.; weight average molecular weight (Mw): 5000, solid content: 50%) and 25 g aqueous ammonia (25%) were mixed fully, 200 g ethanol solution (95%) at 50° C. was added, then about 4.6 g tetraethoxysilane (TEOS) was added slowly, and reacted with continuous stirring for 5 hours. The resulting product was washed with water, then 184 g polyacrylic resin of Preparation Example 1 (solid content of 50%) was added slowly, and reacted with continuous stirring for 5 hours at 50° C., to give a mixed solution containing particles. The mixed solution was cooled to 25° C., 200 g toluene was added for phase separation, and then an upper liquid was taken out, to give the coating composition according to the present invention. The upper liquid contained toluene, the adhesive and the hollow particles, and the weight ratio of the hollow particles to the solid content of the adhesive was calculated to be 1:20 by using a test method.

Example 3

The Hollow Particles:Solid Content of the Adhesive=1:10

0.5 g polyacrylic acid (model: 06519-250, Polyscience Corp.; weight average molecular weight (Mw): 5000, solid content: 50%) and 25 g aqueous ammonia (25%) were mixed fully, 200 g ethanol solution (95%) at 50° C. was added, then about 4.6 g tetraethoxysilane (TEOS) was added slowly, and reacted with continuous stirring for 5 hours. The resulting product was washed with water, then 92 g polyacrylic resin of Preparation Example 1 (solid content of 50%) was added slowly, and reacted with continuous stirring for 5 hours at 50° C., to give a mixed solution containing particles. The mixed solution was cooled to 25° C., 200 g toluene was added for phase separation, and then an upper liquid was taken out, to give the coating composition according to the present invention. The upper liquid contained toluene, the adhesive and the hollow particles, and the weight ratio of the hollow particles to solid content of the adhesive was calculated to be 1:10 by using a test method.

Embodiment 4

Hollow Particles:Solid Content of the Adhesive=1:3

0.5 g polyacrylic acid (model: 06519-250, Polyscience Corp.; weight average molecular weight (Mw): 5000, solid content: 50%) and 25 g aqueous ammonia (25%) were mixed fully, 200 g ethanol solution (95%) at 50° C. was added, then about 4.6 g tetraethoxysilane (TEOS) was added slowly, and reacted with continuous stirring for 5 hours. The resulting product was washed with water, then 46 g polysiloxane resin of Preparation Example 2 (solid content of 30%) was added slowly, and reacted with continuous stirring for 5 hours at 50° C., to give a mixed solution containing particles. The mixed solution was cooled to 25° C., 200 g toluene was added for phase separation, and then an upper liquid was taken out, to give the coating composition according to the present invention. The upper liquid contained toluene, the adhesive and the hollow particles, and the weight ratio of the hollow particles to solid content of the adhesive was calculated to be 1:3 by using a test method.

Example 5

Hollow Particles:Solid Content of the Adhesive=1:20

0.5 g polyacrylic acid (model: 06519-250, Polyscience Corp.; weight average molecular weight (Mw): 5000, solid content: 50%) and 25 g aqueous ammonia (25%) were mixed fully, 200 g ethanol solution (95%) at 50° C. was added, then about 4.6 g tetraethoxysilane (TEOS) was added slowly, and reacted with continuous stirring for 5 hours. The resulting product was washed with water, then 307 g polysiloxane resin of Preparation Example 2 (solid content of 30%) was added slowly, and reacted with continuous stirring for 5 hours at 50° C., to give a mixed solution containing particles. The mixed solution was cooled to 25° C., 200 g toluene was added for phase separation, and then an upper liquid was obtained, to give the coating composition according to the present invention. The upper liquid contained toluene, the adhesive and the hollow particles, and the weight ratio of the hollow particles to solid content of the adhesive was calculated to be 1:20 by using a test method.

Comparative Example 1

Merely Containing the Adhesive

The polyacrylic resin of Preparation Example 1 and isopropanol were directly formulated into a coating composition containing 4 wt % polyacrylic resin.

Comparative Example 2

Hollow Particles:Solid Content of the Adhesive=1:1

0.5 g polyacrylic acid (model: 06519-250, Polyscience Corp.; weight average molecular weight (Mw): 5000, solid content: 50%) and 25 g aqueous ammonia (25%) were mixed fully, 200 g ethanol solution (95%) at 50° C. was added, then about 4.6 g tetraethoxysilane (TEOS) was added slowly, and reacted with continuous stirring for 5 hours. The resulting product was washed with water, then 9.2 g polyacrylic resin of Preparation Example 1 (solid content of 50%) was added slowly, and reacted with continuous stirring for 5 hours at 50° C., to give a mixed solution containing particles. The mixed solution was cooled to 25° C., 200 g toluene was added for phase separation, and then an upper liquid was obtained as the coating composition. The upper liquid contained toluene and the adhesive only, without the hollow particles, and the weight ratio of the hollow particles to solid content of the adhesive was calculated to be 1:1 by using a test method.

Comparative Example 3

The Hollow Particles:Solid Content of the Adhesive=1:35

0.5 g polyacrylic acid (model: 06519-250, Polyscience Corp.; weight average molecular weight (Mw): 5000, solid content: 50%) and 25 g aqueous ammonia (25%) were mixed fully, 200 g ethanol solution (95%) at 50° C. was added, then about 4.6 g tetraethoxysilane (TEOS) was added slowly, and reacted with continuous stirring for 5 hours. The resulting product was washed with water, then 322 g polyacrylic resin of Preparation Example 1 (solid content of 50%) was added slowly, and reacted with continuous stirring for 5 hours at 50° C., to give a mixed solution containing particles. The mixed solution was cooled to 25° C., 200 g toluene was added for phase separation, and then an upper liquid was obtained as the coating composition. The upper liquid contained toluene, the adhesive and the hollow particles, and the weight ratio of the hollow particles to solid content of the adhesive was calculated to be 1:35 by a test method.

<Test Method>

1. Method for Determining Compositions of the Upper Liquid (a) measuring the weight of resulting total solids, after toluene was removed at reduced pressure;

(b) subtracting the weight of the solid content of the adhesive from the total solid weight, because the adhesive is insoluble in the lower liquid, so as to give the content of hollow spheres; and (c) recording the obtained results in the foregoing embodiments and comparative examples.

2. Transmittance Test Method (a) material of a substrate: glass substrate (100 mm ultrawhite glass, supplied by Jianhui Company)

(b) preparation of the film to be tested: the upper liquids obtained in the foregoing embodiments and comparative examples were applied onto a glass substrate through dip coating, and heated for 5 minutes in an oven at 60° C. to remove the solvent, so as to form a coating layer having a thickness of 125 nm on two surfaces of the substrate.

Figure 4:
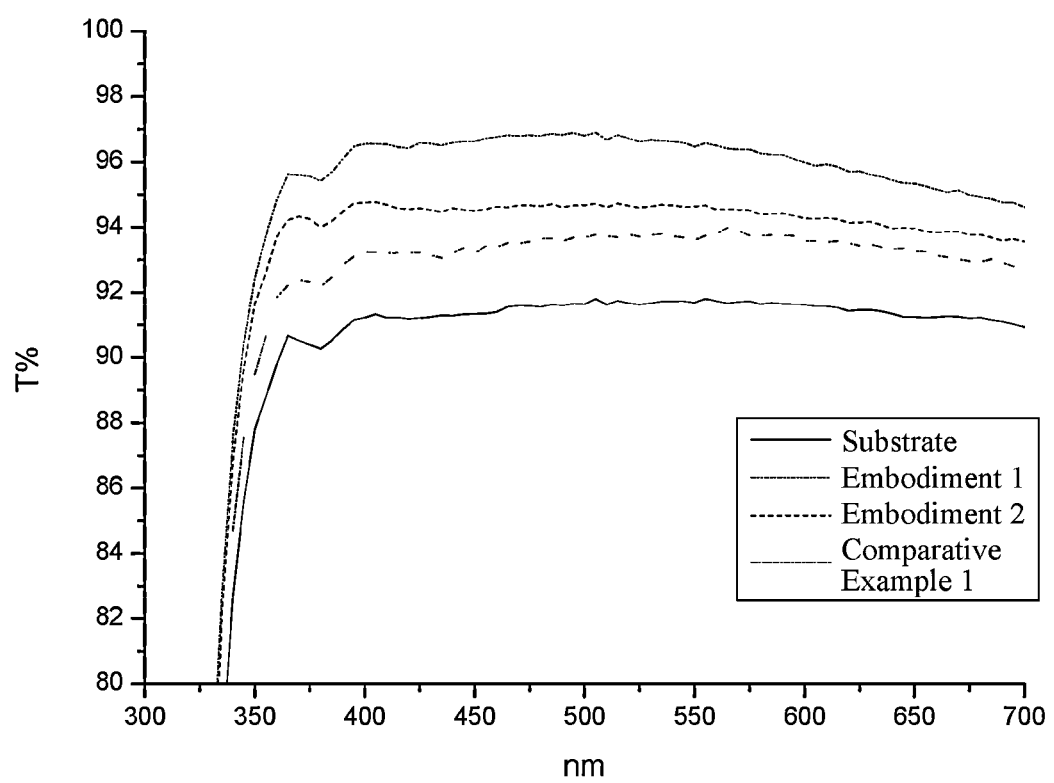
FIG. 4 shows transmittance spectra comparing the films formed by dipping both the surfaces of a glass substrate in the coating compositions of Examples 1 and 2 according to the present invention and Comparative Example 1 and the glass substrate itself.

(c) measuring the transmittance of the glass substrate and the coating layers to be tested by using an Ultraviolet Absorption Spectrophotometer (Perkin Elmer Corp., Lamda 900), with the obtained results recorded in FIG. 4 and Table 1.

FIG. 4 is a transmittance spectrum of the films prepared by using the coating compositions of Examples 1 to 2 according to the present invention and Comparative Examples 1.

TABLE 1

|  | Hollow particles: solid content of adhesive | Composition of upper liquid | Transmission %, at 550 nm |
|---|---|---|---|
| Glass substrate | — | — | 91.7 |
| Example 1 | 1:3 | ● | 96.5 |
| Example 2 | 1:20 | ● | 94.6 |
| Example 3 | 1:10 | ● | 95.6 |
| Example 4 | 1:3 | ● | 96.2 |
| Example 5 | 1:20 | ● | 94.2 |
| Comparative Example 1 | merely containing the adhesive | — | 93.6 |
| Comparative Example 2 | 1:1 | X | 93.6 |
| Comparative Example 3 | 1:35 | ● | 93.8 |

●: The upper liquid contains hollow particles.
X: The upper liquid does not contain hollow particles.

It can be seen through comparison of transmittance of visible light of 550 nm of the films from Table 1 and FIG. 4 that, through dual-surface coating with the coating composition in which the ratio of the hollow particles:solid content of the adhesive is 1:20 (Example 2), the transmittance of the original glass substrate is increased by 2.9%, from 91.7% to 94.6%; through dual-surface coating with the coating composition in which the ratio of the hollow particles:solid content of the adhesive is 1:10 (Example 3), the transmittance of the original glass substrate is increased by 3.9%, from 91.7% to 95.6%; and through dual-surface coating with the coating composition in which the ratio of the hollow particles:solid content of the adhesive is 1:3 (Example 1), the transmittance of the original glass substrate is increased by 4.8%, from 91.7% to 96.5%. The results show that the coating layer prepared by using the coating composition according to the present invention can effectively enhance the transmittance of the substrate, and can effectively reduce the loss in reflection of light, and moreover, the higher the content of the hollow particles, the more significant the effect.

As demonstrated by Examples 1 to 2, the increase in transmittance also occurs in Examples 4 to 5. The results show that, the adhesive according to the present invention is not limited to the polyacrylic resin modified by a silicon-containing compound. The polysiloxane resin can also be used to obtain similar efficacy in an increased transmittance.

For the films prepared by using the coating compositions of Comparative Examples 1 to 3, the transmittance merely are 93.6%, 93.6% and 93.8% respectively, indicating that excessively high ratio or excessively low ratio of the hollow particles to the solid content of the adhesive cannot effectively increase the light transmittance.

Although a high content of the hollow particles (the hollow particles:the solid content of the adhesive=1:1) was used in Comparative Example 2, the finally obtained upper liquid merely contains the adhesive and toluene. It can be seen from the experimental results that, when the content of the hollow particles is excessively high, the adhesive cannot be effectively bonded with the hollow particles to cover the hollow particles and the hollow particles cannot be effectively dispersed in the adhesive. Therefore, after phase separation, the upper liquid merely contains the adhesive and toluene, without the hollow particles, and the obtained transmittance is similar to that in the Comparative Example 1 (merely the adhesive exists).

If the ratio of the solid content of the adhesive in the composition of Comparative Example 3 is excessively high, the relative content of the hollow particles is lowered, so that transmittance cannot be effectively increased, and the obtained transmission is similar to that of the composition merely containing the adhesive of Comparative Example 1.

What is claimed is:

1. An anti-reflection coating composition, comprising hollow particles, an adhesive and a hydrophobic organic solvent, wherein the hollow particles are dispersed in the adhesive and are chemically bonded with the adhesive, and the weight ratio of the hollow particles to the solid content of the adhesive is in the range of 1:2 to 1:20, wherein the hollow particles are inorganic oxide particles containing an element selected from the group consisting of silicon, titanium, zirconium and a combination thereof; and wherein the adhesive is a polyacrylic resin modified by a silicon-containing compound or a polysiloxane resin, and the adhesive has a hydrophobic group selected from the group consisting of phenyl, benzyl, alkyl and a combination thereof and has a group $-Si(OR^1)_n(R^2)_{3-n}$, wherein n is an integer of 2 or 3, $R^1$ is each independently H or $C_{1-4}$ alkyl, and $R^2$ is each independently H or $C_{1-4}$ alkyl, wherein the ratio of the weight of the hydrophobic organic solvent to the total weight of the hollow particles and the solid content of the adhesive is in the range of 1.5:1 to 40:1.

2. The anti-coating composition according to claim 1, wherein the hollow particles are hollow silica particles.

3. The anti-reflection coating composition according to claim 1, wherein the silicon-containing compound is an organosilane terminated with a reactive group, and the reactive group is an organic group having an amino group, a hydroxyl group, a mercapto group, an isocyanate group, an epoxy group, a vinyl group or a (methyl)acryloxy group.

4. The anti-reflection coating composition according to claim 1, wherein the weight ratio of the hollow particles to the solid content of the adhesive is in the range of 1:3 to 1:20.

5. The anti-reflection coating composition according to claim 4, wherein the weight ratio of the hollow particles to the solid content of the adhesive is in the range of 1:3 to 1:10.

6. The anti-reflection coating composition according to claim 1, wherein the hydrophobic organic solvent is selected from the group consisting of toluene, ethyl acetate, butyl acetate and a combination thereof.

7. The anti-reflection coating composition according to claim 1, wherein the ratio of the weight of the hydrophobic organic solvent to the total weight of the hollow particles and the solid content of the adhesive is in the range of 2:1 to 15:1.

8. The anti-reflection coating composition according to claim 1, wherein the hollow particles have a size in the range of 10 nm to 100 nm.

* * * * *